United States Patent
Ranganathan

[19]

[11] Patent Number: 6,098,169
[45] Date of Patent: Aug. 1, 2000

[54] THREAD PERFORMANCE ANALYSIS BY MONITORING PROCESSOR PERFORMANCE EVENT REGISTERS AT THREAD SWITCH

[75] Inventor: Kumar Ranganathan, Portland, Oreg.

[73] Assignee: Intel Corporation, Santa Clara, Calif.

[21] Appl. No.: 08/997,043

[22] Filed: Dec. 23, 1997

[51] Int. Cl.[7] .................................................. G06F 11/34
[52] U.S. Cl. ..................... 712/227; 702/182; 709/107; 714/38
[58] Field of Search ................... 714/39, 47, 38; 712/227; 713/502; 709/9, 107; 702/186, 187, 182

[56] References Cited

U.S. PATENT DOCUMENTS

| | | | |
|---|---|---|---|
| 5,557,548 | 9/1996 | Gover et al. ............................. | 702/176 |
| 5,657,253 | 8/1997 | Dreyer et al. ............................ | 702/186 |
| 5,752,062 | 5/1998 | Gover et al. ............................. | 714/37 |
| 5,796,939 | 8/1998 | Berc et al. ................................ | 714/47 |
| 5,835,705 | 11/1998 | Larsen et al. ............................ | 714/47 |

*Primary Examiner*—Kenneth S. Kim
*Attorney, Agent, or Firm*—Kenyon & Kenyon

[57] ABSTRACT

A thread switch handler is provided which monitors performance characteristics of a processor executing instructions from two or more threads of an application. The thread switch handler detects when the processor has switched between a first and second thread and is capable of reading the performance registers available in many commercial processors at or about that time. The data that is read from the performance registers at each thread switch represents performance characteristics of the processor on a per-thread basis.

22 Claims, 6 Drawing Sheets

```
Thread Switch Handler Algorithm(Outgoing ThreadID, Incoming
ThreadID);

OldTDB = Find TDB from Thread Tree (Outgoing threadID);
OldPDB = Find PDB from Thread Tree (Outgoing ThreadID);
NewTDB = Find TDB from Thread Tree (Incoming ThreadID);
NewPDB = Find PDB from Thread Tree (Incoming ThreadID);

Delta1=Counter1-OldTDB.StartCPUCtrl;
Delta2=Counter2-OldTDB.StartCPUCtr2;
DeltaTSC = TSC-OldTDB.StartCPUTSC;

OldTDB.CPUCounter1 += Delta1;
OldTDB.CPUCounter2 += Delta2;
OldTDB.TimeStampCounter += DeltaTSC;

NewTDB.StartCPUCtrl = Counter1;
NewTDB.StartCPUCtr2 = Counter2;
NewTDB.TimeStampCounter = TSC;

OldPDB.CPUCounter1 += Delta1;
OldPDB.CPUCounter2 += Delta2;
OldPDB.TimeStampCounter += DeltaTSC;
```

FIG. 7 ions # 6,098,169

THREAD PERFORMANCE ANALYSIS BY MONITORING PROCESSOR PERFORMANCE EVENT REGISTERS AT THREAD SWITCH

BACKGROUND OF THE INVENTION

1. Field of the Invention

The present invention pertains to a method and apparatus for dynamic thread-level processor performance characterization. More particularly, the present invention pertains to a method and apparatus for tracking processor events, at the software thread level, during execution of one or more software programs.

2. Related Art

A processor, such as a Pentium® processor (Intel Corporation, Santa Clara, Calif.) is capable of executing a series of instructions in succession. The instructions to be executed are typically stored in a memory (such as Random Access Memory). Also, the processor can be coupled to a cache memory for storing data or instructions to be used by the processor. As the processor executes instructions, certain "events" can be monitored which can typically characterize the performance of the processor. As used herein, the term "event" refers to actions taken by the processor, errors in the operation of the processor, and any other such information that indicates a performance characteristic of the processor or the like.

Performance monitoring is available in connection with the operation of the Pentium® processor. This performance monitoring is described, for example, in "Pentium® Processor Family Developer's Manual, Vol. 3: Architecture and Programming Manual" (1995, pp. 26–1 to 11), which is available from Intel Corporation. As seen in this reference, performance registers are provided in the processor for monitoring various parameters that contribute to the performance of the processor. For example, in several models of the Intel Pentium® processor, the following performance registers are provided on-chip: a 64-bit Time Stamp Counter (TSC), two programmable event counters (CTR0, CTR1), and a Control and Event Select Register (CESR). By placing a value in the CESR, one or both of the counters (CTR0, CTR1) are set up to count a desired event or to count clock signals while an event condition is present or absent. For example, by placing the appropriate data value in the CESR, the first counter, CTR0, can be set up to count the number of times a data read operation is performed by the processor (e.g, from its cache memory). Once CTR0 is set up to perform this task, each time the processor performs a data read operation, CTR0 increments its internal count. There are numerous events that can be monitored using this system such as data cache read/write misses, loading of a segment register, etc. As mentioned above, the duration of an event condition (or absence thereof) can be monitored such as the number of clock pulses counted while a bus cycle is in progress, the number of clocks stalled due to full write buffers, etc. Other examples can be found in the Developer's Manual referenced above. Similar performance monitoring features are available in other processors such as the Alpha® processor by Digital Equipment Corporation, Maynard, Mass. and the PowerPC® processor by Motorola Corporation, Schaumburg, Ill.

A user accesses the CESR, counters (CTR0, CTR1) and TSC via execution of a device driver. For example, a user's request to load a value into the CESR includes the following steps: 1. a performance monitoring application allows the user to input a desired event monitoring scenario; 2. the request is translated into a value for the CESR; 3. this value is then sent by the performance monitoring application to the device driver via an operating system (OS) service call; 4. the performance device driver loads the CESR with the appropriate value. The performance device driver can then retrieve values stored in the CESR and counters (CTR0, CTR1) and any time-stamp information from the TSC and forward the data to the performance monitor application for display to the user.

The performance monitoring system described above is useful to programmers who write source code. For example, the performance monitoring system can detect events which tend to indicate inefficiencies in the overall code design. Processor designers and architects can also benefit since it allows them to observe the properties of the software that will execute on the processor and can, therefore, optimize their hardware design to deliver the best performance for the software. Designers of integrated circuit (IC) chips to be used with the processor can also benefit from this system in a similar manner. The Windows95® Operating System and Windows NT® Operating System (Microsoft Corporation, Redmond, Wash.) are examples of operating systems that support the performance monitoring system described above.

In a typical processor system, one or more applications are running (i.e., being executed by the processor). As known in the art, the code of an application (e.g., a word-processing application, a video conferencing application, etc.) can be divided into a plurality of processes and each process can be divided into a plurality of threads. Thus, a thread can be a series of instructions that are executed by the processor to achieve a given task (e.g., a subroutine) and is identified by a 32-bit code in the Windows 95® and Windows NT® operating systems. A processor is often switching between threads of a process and between processes of the application. In a so-called multi-tasking environment, the processor is also switching between two or more applications.

A drawback of the aforementioned performance monitoring system is that it primarily focuses on the operation of the processor without consideration as to which thread, process, or application is being executed. A feature that exists in the Windows NT® operating system as opposed to the Windows 95® operating system is that a user can track how much time, as a percentage, the processor spends executing instructions in a thread compared to the system as a whole. Thus, over a given amount of time the processor is executing instructions, the user is able to see the percentage of that time that is taken by a given thread using this feature of the Windows NT® operating system. With the operating systems and performance monitoring systems available in the art, however, a user is unable to determine, at the thread level, how many of the aforementioned monitored processor-level events have occurred.

As an example, in a multimedia application that combines both audio processes and video processes, the user could use the performance monitoring system described as known in the art to determine that a greater than normal number of data cache read/write misses have occurred during execution of the application. Using the techniques known in the art alone, the user would not be able to determine, however, whether the execution of threads in the audio or video processes were contributing to the number of data cache read/write misses. If the particular event that is being monitored is adversely affecting the operation of the application(s), then it would be advantageous to determine in which process or thread the event occurs. For example, knowing such information would allow a programmer to redraft that section of the code so as to reduce the number of the monitored events during execution of the program. Without such information, the programmer is left to attempt to redraft multiple threads and processes to achieve the same result. Accordingly, there is a need for a method and apparatus that allows a user to dynamically monitor thread-level processor performance.

SUMMARY OF THE INVENTION

In one embodiment of an apparatus of the present invention a processor is provided that is adapted to execute first and second threads where each of the first and second threads includes a series of instructions. The processor includes at least one performance register adapted to record at least one occurrence of a processor event. A thread switch handler is also provided that is adapted to detect when the processor switches between execution of the first thread and the second thread and is also adapted to monitor the performance register of the processor and attribute the processor event to the execution of the first thread.

BRIEF DESCRIPTION OF THE DRAWINGS

FIG. 7 is exemplary code showing the handling of data from performance registers in processor by the thread switch handler according to an embodiment of the present invention.

DETAILED DESCRIPTION

Figure 1:
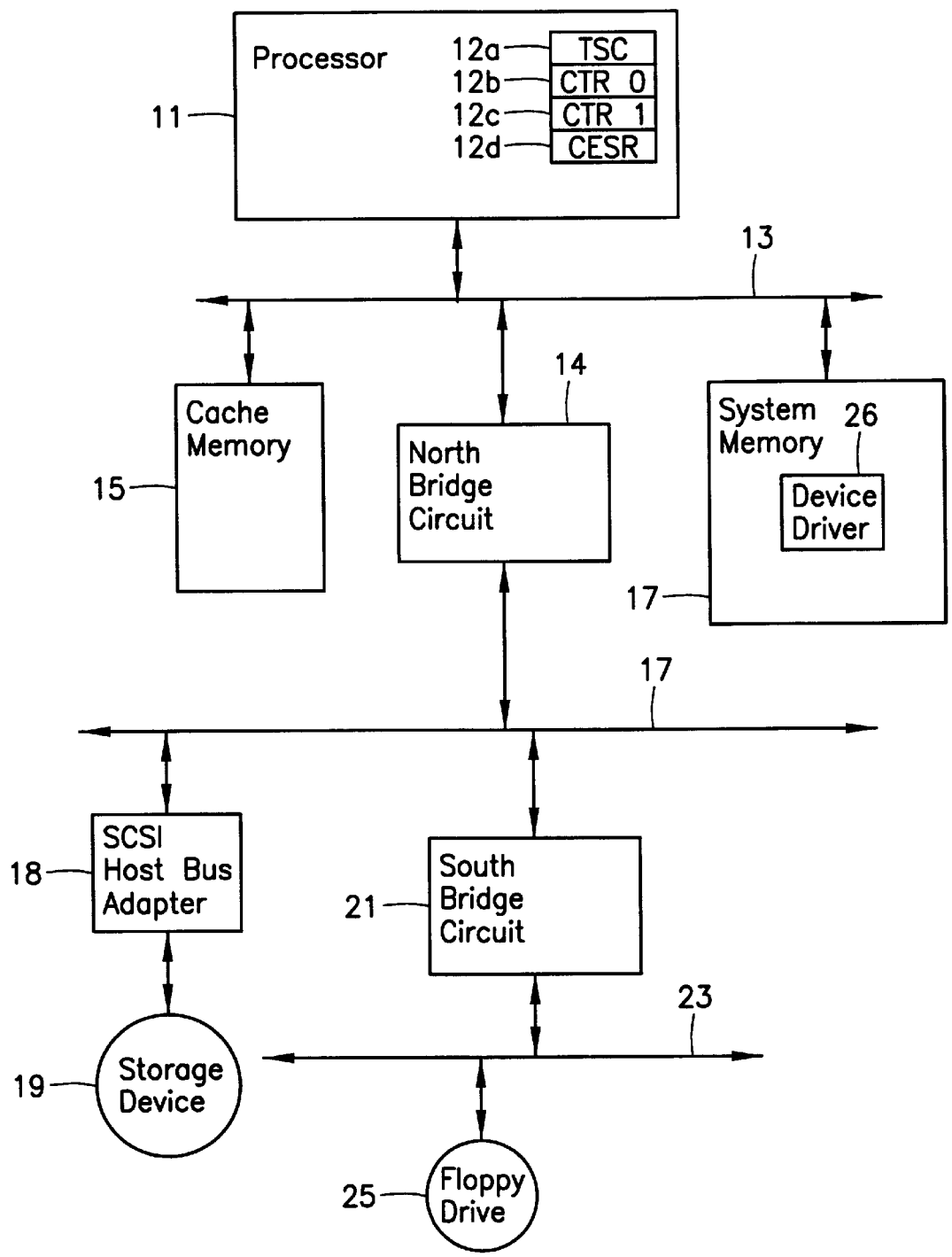
FIG. 1 is a block diagram of an apparatus for monitoring per-thread performance characteristics of a processor constructed according to an embodiment of the present invention.

An example of a computer architecture including an embodiment of the present invention is shown in FIG. 1. A processor 11, such as a Pentium® processor mentioned above is coupled to a host bus 13. Processor 11 includes the performance registers described above: TSC 12a, CTR0 12b, CTR1 12c, and CESR 12d. Coupled to host bridge 13 is a cache memory 15 and system memory 17. In this example, cache memory 15 can be Static Random Access Memory (RAM) and system memory can be Random Access Memory (RAM) as is known in the art. Also coupled to the host bus 13, cache memory 15 and system memory 17, is a host-to-PCI bridge or North bridge circuit 14. North bridge circuit 14 interfaces between the host bus 13 and a PCI bus 17. PCI bus 17 operates according to the Peripheral Component Interconnect (PCI) Specification (Rev. 2.1, PCI Special Interest Group, Hillsboro, Oreg., 1995). A Small Computer System Interface (SCSI-2 standard) host bus adapter 18 is provided which couples PCI bus 17 to a storage device 19 such as a hard-disc drive or Compact Disc—Read Only Memory (CD-ROM) drive. A PCI-to-ISA bridge or South bridge circuit is provided coupled between PCI bridge 17 and an expansion bus, such as an Industry Standard Architecture (ISA) bus 23. North bridge circuit 14 and South bridge circuit 21 are provided, for example, in the 82430FX PCIset product from Intel Corporation. A variety of devices can be coupled to the ISA bus 23, such as a 3.5" floppy drive 25 which accepts 3.5" floppy storage media.

In this example, operating system code is loaded from storage device 19 to system memory 17 and executed by processor 11. In many operating systems, such as the Windows 95® and Windows NT® operating systems, a number of device drivers are loaded (from storage device 19, for example) into system memory 17, as well. A device driver is code, executed by processor 11, that works in conjunction with the operating system to allow the operating system to interface with a specific hardware device. In this example, the device driver is stored in system memory 17 as component 26.

Figure 2:
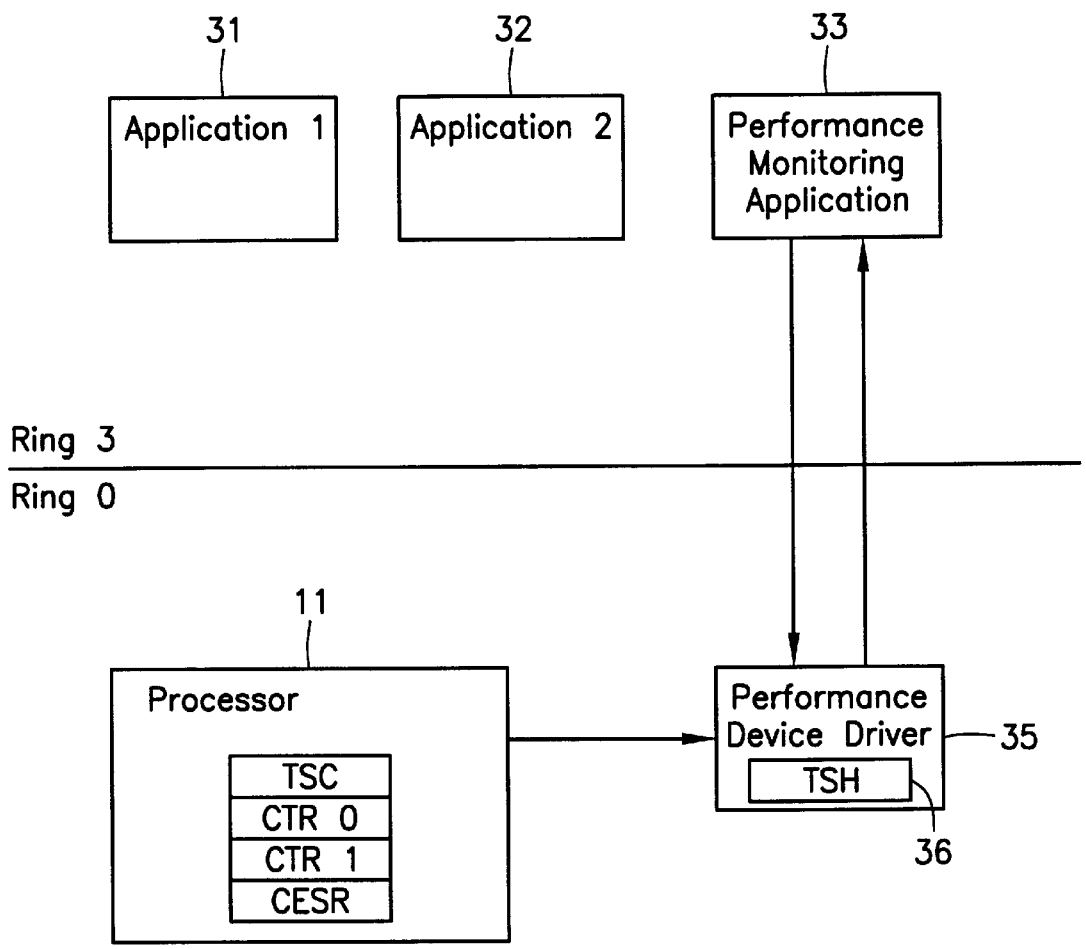
FIG. 2 is a functional block diagram showing the interaction of a thread switch handler, a performance monitoring application and a processor according to an embodiment of the present invention.

Referring to FIG. 2, a functional block diagram of an embodiment of the present invention is shown. In this embodiment, two applications are concurrently open (i.e., code of these applications is being executed by processor 11 in FIG. 1) and are identified as Application 1 (element 31) and Application 2 (element 32). For example, Application 1 could be a video conferencing application and Application 2 could be a word processing application. In this embodiment of the present invention, a third application is open, a performance monitoring application 33, which periodically requests and receives processor performance data and presents this data to the user. Application 1, Application 2, and performance monitoring application 33 can be executed in "Ring 3" (indicating a lower priority for execution). Performance monitoring application 33 interfaces with a performance device driver 35 that includes a thread switch handler (TSH) 36. Though physically separate pieces of code, device driver 35 and thread switch handler 36 can be construed to be a component of the overall performance monitoring infrastructure. As described above, the operation of device driver 35 (i.e., execution of the device driver code) monitors and interacts with the registers in processor 11.

In the embodiment of FIG. 2, device driver 35 executes in "Ring 0" (indicating a higher priority for execution) and interacts with the Windows ® 95 Virtual Machine Manager (VMM) via the VMM services Application Program Interface (API) in order to gather OS performance data. Device driver 35 also accesses the performance counter and event selection registers of processor 11. Device driver 35 communicates performance data to performance monitoring application 33 via the DeviceIoControl Win32 API using a custom IOCTL (Input/Output Control) code. In this embodiment, at every sampling interval, the performance monitoring application calls into a performance Dynamic Linkable Library (DLL) which in-turn passes a buffer down to device driver 35 along with the custom IOCTL code. In response to this IOCTL request, device driver 35 gathers the appropriate performance data which it maintains in its internal data structures and places this performance data in the buffer that was passed to it. Depending upon the IOCTL code, the performance data returned by the device driver 35 could include system-wide performance data such as the contents of the performance registers of processor 11 or it could include thread-specific or process-specific performance data. Upon returning from the call, the performance DLL repackages the performance data and returns it to performance monitoring application 33 for rate-conversion (i.e., change in counter value divided by change in time) and display.

Device driver 35 can track any event that is being monitored by the processor performance registers on a system-wide, per-process and per-thread basis. To track any data on a per-thread and per-process basis, the OS should provide the following key mechanisms: (a) a way to notify device driver 35 when a new thread is created (including the new thread's identifier), (b) a way to notify device driver 35 when a thread is terminated, to deallocate any per-thread data structures that device driver 35 may have allocated, (c) a way for device driver 35 to determine the process identifier that corresponds to a newly created thread, (d) a way to install thread-switch handler 36 that is invoked by the OS scheduler upon every thread switch; the incoming and outgoing thread identifiers are made available to the thread-switch handler function, (e) a way for device driver 35 to enumerate all the existing threads in the system (enabling a dynamically loadable performance driver); and (f) a way to disable OS scheduling by device driver 35 entry point code. This requirement provides the accuracy that is required to correctly track newly created and terminating threads.

Figure 3:
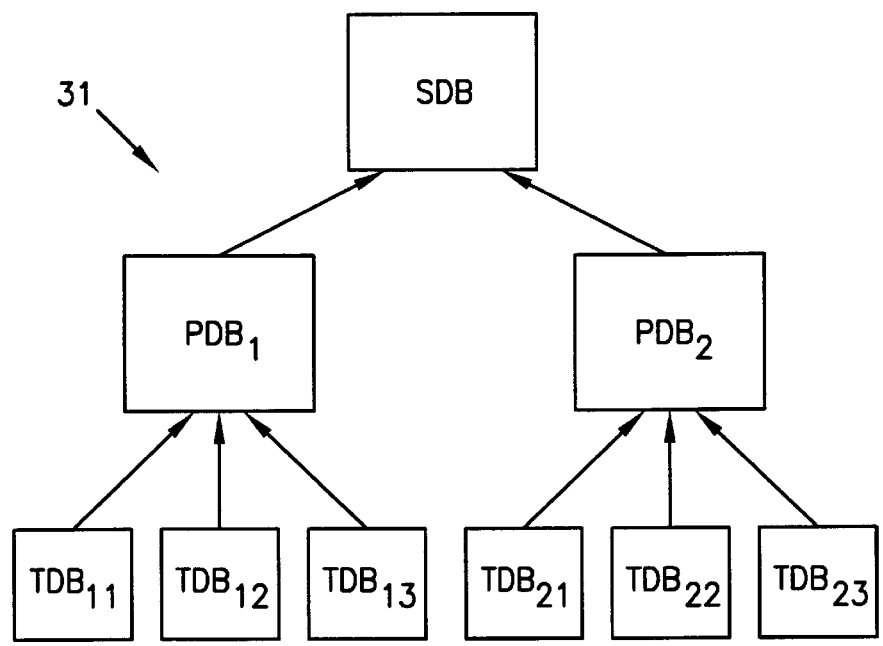
FIG. 3 is an example of a thread tree for the storing of performance data according to an embodiment of the present invention.

Given the OS mechanisms enumerated above, performance device driver 35 allocates and maintains three fundamental data structures shown in FIG. 3: (1) A thread data block (TDB) for each thread; the TDB includes per-thread performance data and other attributes. (2) A process data block (PDB) for each process containing per-process performance data; and (3) A single data block (SDB) containing system-wide performance statistics.

The performance parameters can be hierarchically summed (e.g., the performance data rates within a process is the sum of the performance data rates of its individual threads; similarly, the system-wide performance data rate is the sum of the per-process performance data rates, etc.). The relationship between these key data structures can be organized as a tree-structure, such as the thread tree shown in FIG. 3. FIG. 3 shows an example thread-tree for a simple scenario including two processes with three threads each. In this example, process data block $PDB_1$ is divided into three threads or thread data blocks $TDB_{11}$, $TDB_{12}$, $TDB_{13}$ and process $PDB_2$ is divided into three threads or thread data blocks $TDB_{21}$, $TDB_{22}$, $TDB_{23}$. As is known in the art, the operating system controls which thread is being executed by the processor 11 at any given time.

When the device driver 35 first initializes, a single SDB is allocated. Whenever a new thread is created, a new TDB is created and associated with it. In a Windows® 95 implementation of device driver 35, a thread-local storage slot entry is reserved, in which a pointer to the thread's TDB is stored. Whenever it is detected that a newly created thread does not belong to an existing process, a new PDB is created. A link in every TDB points to the containing PDB. When a thread terminates, its associated TDB in the thread tree can be deallocated; if it is the last thread in a process, the PDB can also be deallocated.

When the device driver 35 is dynamically loaded, the initial thread tree should be constructed. This thread tree reflects all the threads and processes in existence at the time device driver 35 is loaded. Once this is done, the thread tree is dynamically updated by device driver 35 every time a new thread is created or an existing thread is terminated. Thus, the thread tree at all times tracks the relationship between existing threads and their containing process. The initial thread tree is constructed by enumerating all the threads in the system and determining to which process they belong. This is achieved in Windows® 95 operating system by the Get_Next_Thread_Handle VMM service.

Figure 4:
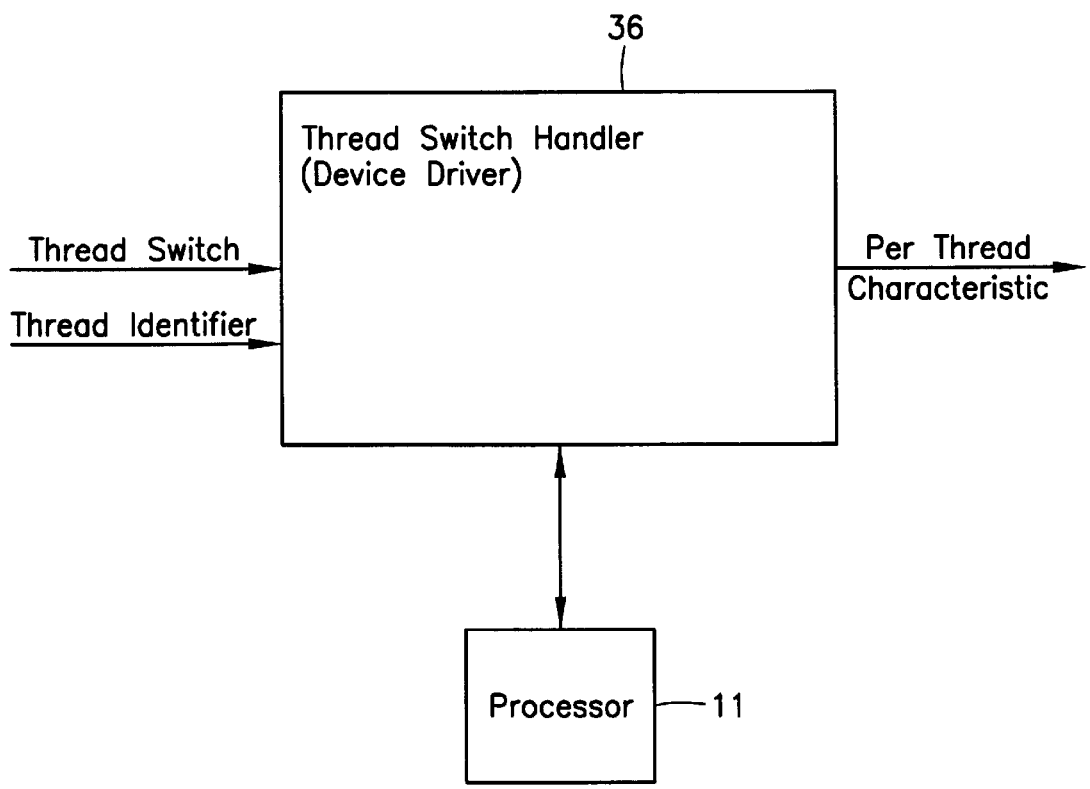
FIG. 4 is a functional block diagram of a thread switch handler operating according to an embodiment of the present invention.

Referring to FIG. 4, a block diagram including thread switch handler 36 (see FIG. 2) is shown. Thread switch handler 36 can be implemented through the execution of device driver code loaded from storage device 19 and stored in memory 17 (see FIG. 1). Thread switch handler 36 receives from the operating system an indication that a thread switch has taken place. As used herein, the term "thread switch" refers to an incident when processor 11 switches from executing code from a first thread to a second thread. Thread switch handler 36 also receives a thread identifier identifying the thread to which the processor has switched for execution of its code. In addition to the thread switch indication and thread identifier, thread switch handler 36 also accesses the values stored in the performance registers/counter of processor 11. As described in further detail below, thread switch handler 36 is capable of outputting performance characteristics for processor 11 at a per-thread level.

Figure 5:
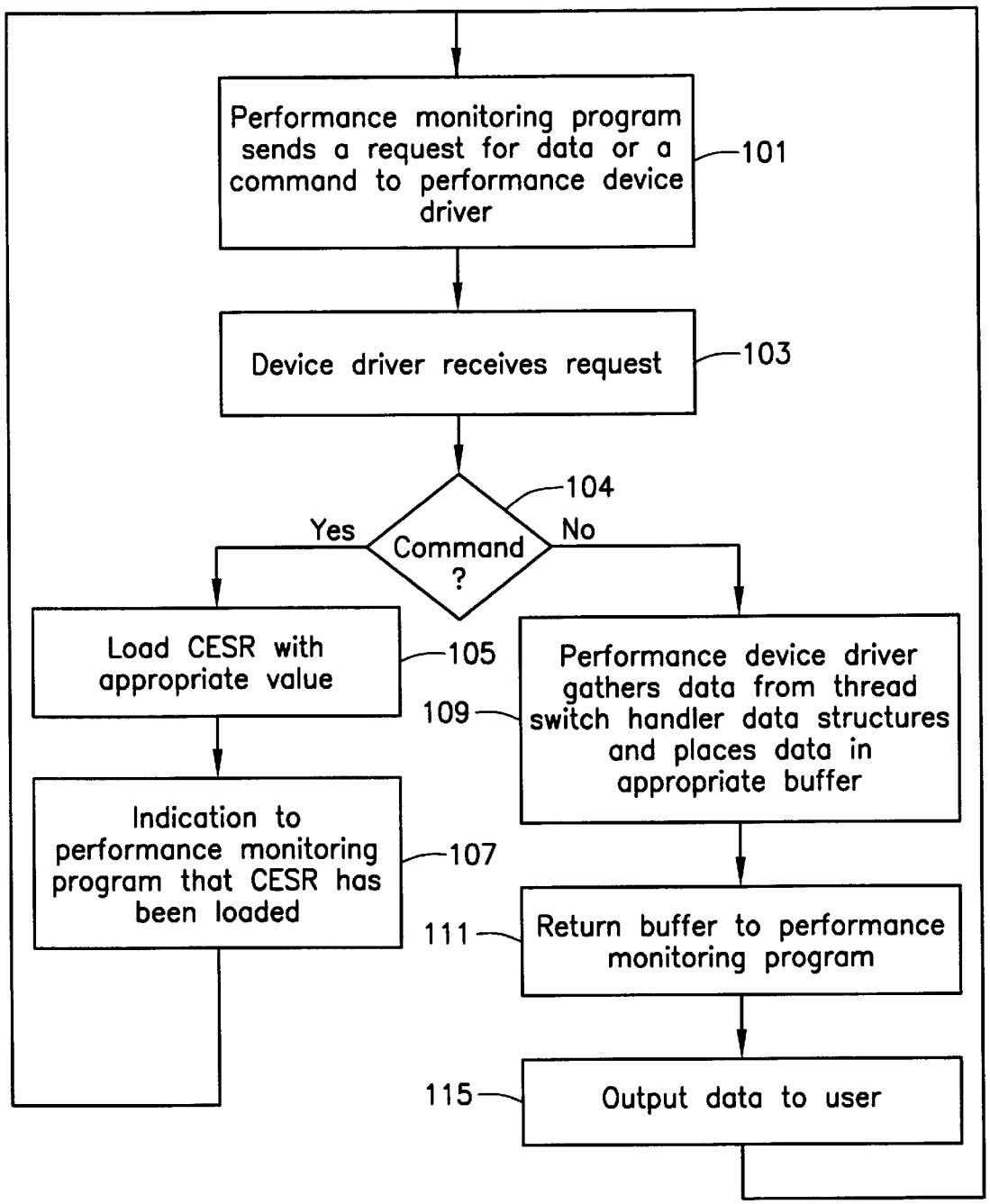
FIG. 5 is a flowchart of a method of an embodiment of the present invention for the interaction between a performance monitoring application and the thread switch handler.

Referring to FIG. 5, a flow diagram of the operation of a performance monitoring program in conjunction with an embodiment of the present invention is shown. In step 101, the operation of the performance monitoring program sends a request for data or a command to the performance device driver. In this example, this is achieved by sending an appropriate Input/Output Control (IOCTL) code to the device driver by the performance driver. If data is being requested, a buffer for such requested data is passed to the device driver as well. The device driver receives the request (step 103). In decision block 104 it is determined whether a command has been sent or a request for data has been sent. If a command has been sent, control passes to step 105 where the device driver loads the CESR with the appropriate value. In step 107, the device driver indicates that the CESR has been loaded to the performance monitoring software. As stated above, the loading of the CESR initiates some of the performance monitoring features of the processor (e.g., the counting of the number of occurrences or duration of certain specified events). If the performance monitoring code has asked for data (decision block 104), then control passes to step 109 where the device driver gathers the appropriate data from the TDB and PDB blocks in the thread tree, which can be maintained in internal data structures and places it into the buffer that was passed from the performance monitoring code. In step 111, the device driver returns the buffer to the performance monitoring code via a Dynamic Linkable Library (DLL) file. In step 115, the performance monitoring code outputs the requested data as desired. The interaction between the performance monitoring code and the device driver can be achieved using a Device I/O Control Windows® 32 API.

Figure 6:
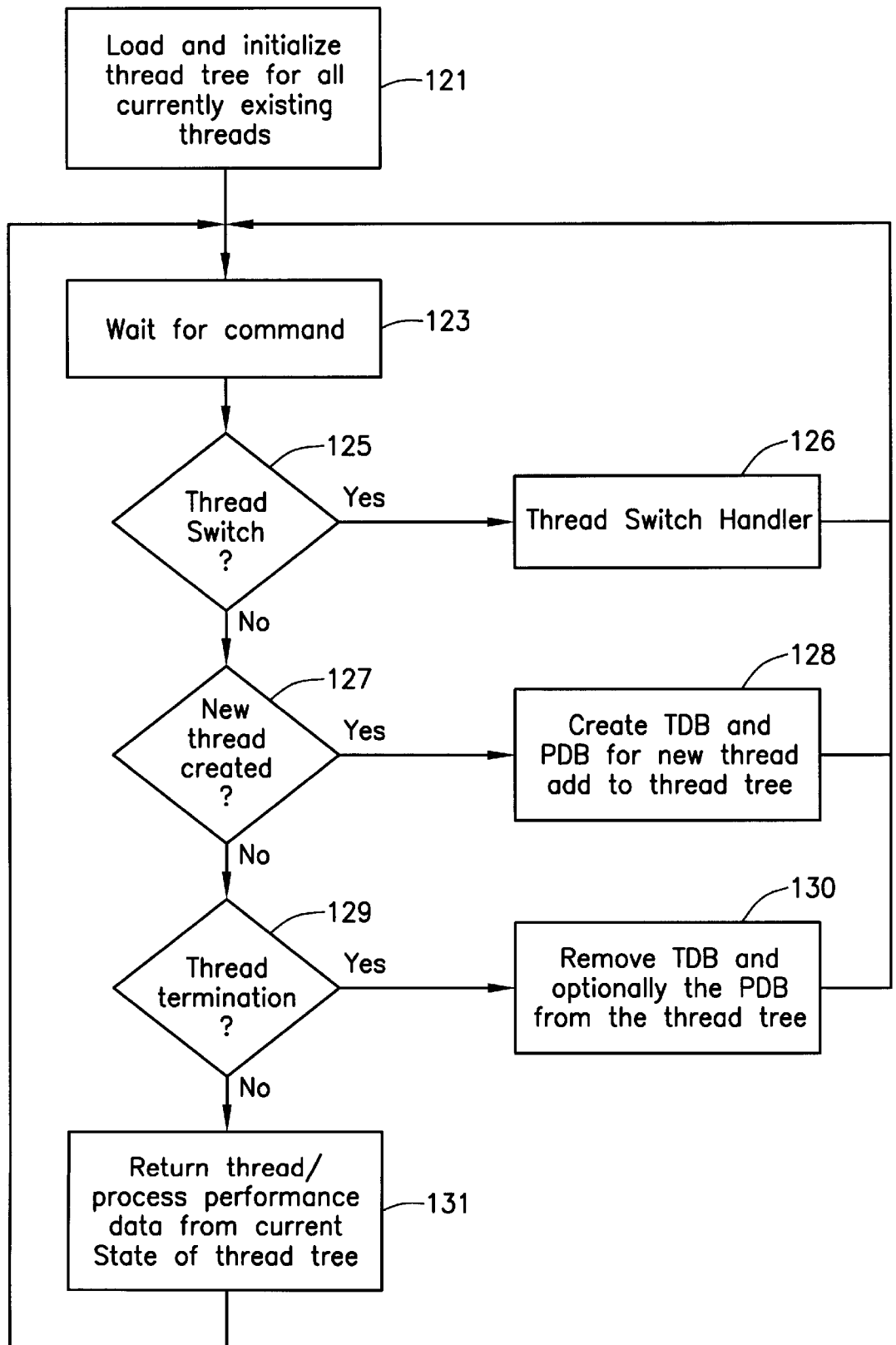
FIG. 6 is a flowchart showing the operation of the thread switch handler according to an embodiment of the present invention.

Referring to FIG. 6, a flowchart of the operation of the operating system in conjunction with the device driver and thread switch handler is shown. In step 121, the device driver is dynamically loaded and an initial thread tree (similar to the one shown in FIG. 3) is constructed reflecting all the threads of the application(s). In this example, the thread tree is set up in memory local to the device driver and is constructed by enumerating all threads in the system, and determining to which process they belong. This can be achieved, for example, in the Windows 95® operating system with the Get_Next_Thread_Handle VMM (Virtual Machine Manager) service (for a further description of this service, see, for example, "Systems Programming for Windows 95", by W. Oney, Microsoft Press, 1996). In step 123, the device drive awaits a command. If a thread switch is received (decision block 125), the thread switch handler is invoked (step 126) to monitor the status registers of processor 11 (described in further detail below with reference to FIG. 7). Thread switch handler 36 can be invoked using the Call_When_Thread_Switched VMM service in the Windows® 95 operating system. If a new thread is created (decision block 127) then control passes to step 128 where a new TDB is created (and PCB if needed) and added to the thread tree. In decision block 129, if a thread has been terminated (i.e., no further execution is to be performed in the thread by the processor), then the TDB can be deallocated (step 130). Optionally, the PDB which includes the deallocated TDB can also be deallocated. In step 131, the remaining command is a request of the device driver for performance data which is returned at a per-thread/per-process basis via the current state of the thread tree.

Updating the thread tree can be done in any a variety of ways, and an example is shown in terms of C programming language in FIG. 7. Each TDB and PDB in the tree structure of FIG. 3 may store three values: two values for the counters (CTR0 and CTR1 in FIG. 1), CPUCounter1 and CPUCounter2; and one value for the TSR, TimeStampCounter. CPUCounter1 and CPUCounter2 are monotonically increasing counters representing the cumulative sum of the processor performance counter transitions that occur when that thread (or process) is being executed. TimeStampCounter represents the cumulative sum of all processor cycles executed by that thread (or process). Also, each TDB has a link to the PDB which contains it to allow processor performance to be monitored on a per-thread and per-process basis (indicated by arrows in FIG. 3).

As a preliminary matter, the current values of performance registers CTR0, CTR1, and TSC are stored in variables Counter1, Counter2, and TSC, respectively, after a thread switch has been detected. Referring to FIG. 7, the relevant data blocks from the thread tree are identified based on the outgoing thread identifier (e.g., a first thread) and the incoming thread identifier (e.g., a second thread). Accordingly, the "OldTDB" and "OldPDB" would be the TDB and PDB, respectively, for the first thread, and the "NewTDB" and "NewPDB" would be the TDB and PDB, respectively, for the second thread. Delta values are generated by subtracting from the current values the values stored in OldTDB.StartCPUCtr1, OldTDB.StartCPUCtr2, and OldTDB.StartCPUTSC. These "OldTDB" data value refer to the status of the CTR0, CTR1 and TSC data values that existed when the current outgoing thread commenced execution by the processor. Delta values, DELTA1 and DELTA2, represent the number of event occurrences registered by CTR0 and CTR1, respectively, during execution of the previous thread since the last thread switch. Delta value, DeltaTSC, represents the number of processor cycles executed (as indicated by TSC) during execution of the previous thread since the last thread switch. These delta values are then stored in variables OldTDB.CPUCounter1, OldTDB.CPUCounter2, OldTDB.TimeStampCounter and represent performance data specific to the outgoing thread ("OldTDB"). The counter values (CTR0, CTR1, and TSC) are then stored in NewTDB.StartCPUCtr1, NewTDB.StartCPUCtr2, NewTDB.TimeStampCounter which represent starting marks for these counter values at the beginning of the execution for the switched-to thread ("NewTDB"). Lastly, the process counters are updated by adding the delta values to OldPDB.CPUCounter1, OldPDB.CPUCounter2, and OldPDB.TimeStampCounter.

As a result of the steps taken with respect to FIG. 7, the thread tree structure of FIG. 3 has been updated to reflect a per-thread and per-process performance characteristics. Using the Device IOCTL API, these values can then be passed to performance monitoring software for output to the user.

Although an embodiment is specifically illustrated and described herein, it will be appreciated that modifications and variations of the present invention are covered by the above teachings and within the purview of the appended claims without departing from the spirit and intended scope of the invention.

What is claimed is:

1. An apparatus for monitoring processor performance characteristics comprising:
    a processor adapted to execute first and second threads where each of said first and second threads includes a series of instructions, said processor including at least one performance register adapted to record at least one occurrence of a processor event; and
    a thread switch handler adapted to detect when said processor switches between execution of said first thread and said second thread and adapted to monitor the performance register of said processor to identify said processor event with the execution of said first thread.

2. The apparatus of claim 1 wherein said thread switch handler is adapted to transfer a data value from said register to a performance monitor application.

3. The apparatus of claim 1 wherein said thread switch handler is adapted to receive an identifier for each of said first and second threads.

4. The apparatus of claim 1 wherein said first thread is part of a first process and said second thread is part of a second process, and said thread switch handler is further adapted to detect when said processor switches between execution of said first process and said second process.

5. An apparatus for monitoring processor performance characteristics comprising:
    a processor adapted to execute first and second threads where each of said first and second threads includes a series of instructions, said processor including at least one performance register adapted to record at least one occurrence of a processor event; and
    a thread switch handler adapted to detect when said processor switches between execution of said first thread and said second thread and adapted to monitor the performance register of said processor to identify said processor event with the execution of said first thread; said thread switch handler is adapted to receive an identifier for each of said first and second threads and said thread switch handler is adapted to store data values from said register in a thread tree data structure, where said thread tree data structure includes a storage area for each of said first and second threads and said first and second processes.

6. The apparatus of claim 5 wherein incrementing the data value in the storage area for said first thread based on said performance register causes the data value in the storage area for the first process to be incremented in a like manner.

7. The apparatus of claim 5 wherein said processor includes a time stamp counter performance register and an event counter performance register.

8. The apparatus of claim 5 wherein thread switch handler detects when said processor switch between execution of said first thread and said second thread via the operation of an operating system.

9. A method for monitoring processor performance characteristics comprising:
   executing a series of instructions of a first thread by a processor;
   recording at least one occurrence of a processor event in a performance register;
   switching from execution of said first thread by said processor to execution of a second thread by said processor, said second thread including a series of instructions;
   detecting, via a thread switch handler, said switching from execution of said first thread to said second thread by said processor; and
   monitoring said performance register of said processor to identify said processor event with the execution of said first thread.

10. The method of claim 9 further comprising:
   transferring a data value from said register to a performance monitor application.

11. The method of claim 9 further comprising:
   receiving an identifier for each of said first and second threads at said thread switch handler.

12. The method of claim 9 wherein said first thread is part of a first process and said second thread is part of a second process, the method further comprising:
   detecting when said processor switches between execution of said first process and said second process.

13. A method for monitoring processor performance characteristics comprising:
   executing a series of instructions of a first thread by a processor;
   recording at least one occurrence of a processor event in a performance register;
   switching from execution of said first thread by said processor to execution of a second thread by said processor, said second thread including a series of instructions;
   receiving an identifier for each of said first and second threads at said thread switch handler;
   detecting, via a thread switch handler, said switching from execution of said first thread to said second thread by said processor;
   monitoring said performance register of said processor to identify said processor event with the execution of said first thread; and
   storing data values from said register in a thread tree data structure, where said thread tree data structure includes a storage area for each of said first and second threads and said first and second processes.

14. The method of claim 13 further comprising:
   incrementing the data value in the storage area for said first thread based on said performance register; and
   incrementing the data value in the storage area for the first process in a like manner.

15. The method of claim 13 wherein said processor includes a time stamp counter performance register and an event counter performance register.

16. The method of claim 13 wherein thread switch handler detects when said processor switches between execution of said first thread and said second thread via the operation of an operating system.

17. A set of instructions residing in a storage medium, said set of instructions capable of being executed by a processor to implement a method for monitoring processor performance characteristics, the method comprising the steps of:
   executing a series of instructions of a first thread by a processor;
   recording at least one occurrence of a processor event in a performance register;
   switching from execution of said first thread by said processor to execution of a second thread by said processor, said second thread including a series of instructions;
   detecting, via a thread switch handler, said switching from execution of said first thread to said second thread by said processor; and
   monitoring said performance register of said processor to identify said processor event with the execution of said first thread.

18. The set of instructions of claim 17, wherein the execution of said set of instructions further comprises the step of:
   transferring a data value from said register to a performance monitor application.

19. The set of instructions of claim 17, wherein the execution of said set of instructions further comprises the step of:
   receiving an identifier for each of said first and second threads at said thread switch handler.

20. The set of instructions of claim 17, wherein said first thread is part of a first process and said second thread is part of a second process, and the execution of said set of instructions further comprises the step of:
   detecting when said processor switches between execution of said first process and said second process.

21. A set of instructions residing in a storage medium, said set of instructions capable of being executed by a processor to implement a method for monitoring processor performance characteristics, the method comprising the steps of:
   executing a series of instructions of a first thread by a processor;
   recording at least one occurrence of a processor event in a performance register;
   switching from execution of said first thread by said processor to execution of a second thread by said processor, said second thread including a series of instructions;
   receiving an identifier for each of said first and second threads at said thread switch handler;
   detecting, via a thread switch handler, said switching from execution of said first thread to said second thread by said processor;
   monitoring said performance register of said processor to identify said processor event with the execution of said first thread; and
   storing data values from said register in a thread tree data structure, where said thread tree data structure includes a storage area for each of said first and second threads and said first and second processes.

22. The set of instructions of claim 21, wherein the execution of said set of instructions further comprises the steps of:
   incrementing the data value in the storage area for said first thread based on said performance register; and
   incrementing the data value in the storage area for the first process in a like manner.

* * * * *

UNITED STATES PATENT AND TRADEMARK OFFICE
CERTIFICATE OF CORRECTION

PATENT NO. : 6,098,169

DATED : August 1, 2000

INVENTOR(S) : Kumar Ranganathan

It is certified that error appears in the above-identified patent and that said Letters Patent is hereby corrected as shown below:

Column 5, line 35, "rates" should read --rate--

Column 8, line 65, "switch" should read --switches--

Column 10, line 48, "handier" should read --handler--

Signed and Sealed this

Eighth Day of May, 2001

Attest:

NICHOLAS P. GODICI

Attesting Officer

Acting Director of the United States Patent and Trademark Office